No. 704,697. Patented July 15, 1902.
W. W. DEAN.
TELEPHONE HOOK SWITCH.
(Application filed May 9, 1901.)
(No Model.) 2 Sheets—Sheet 1.
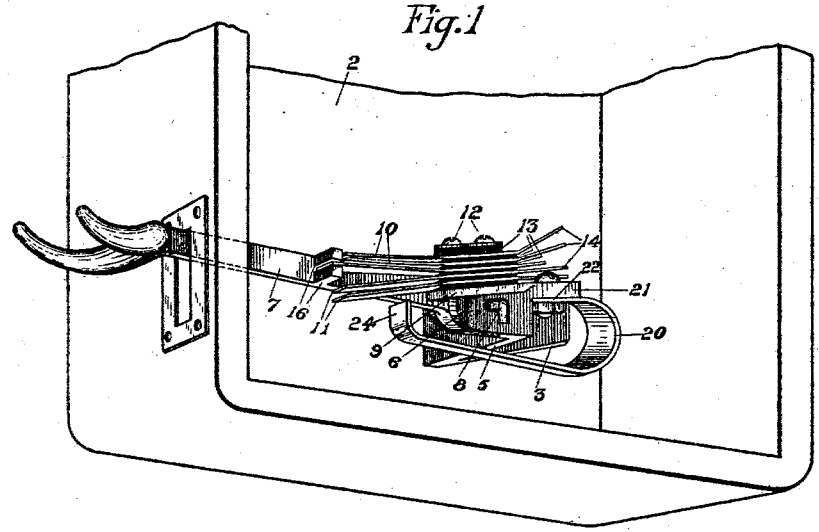
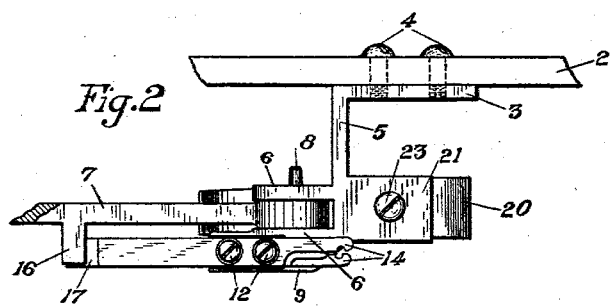
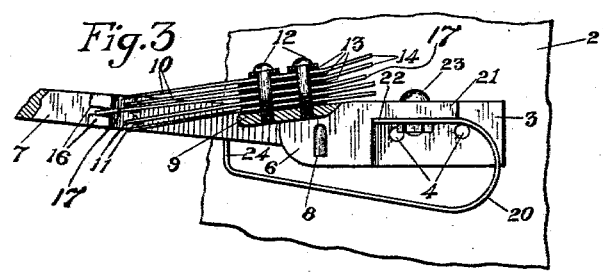
Witnesses. Inventor.
William W. Dean.
by Robert Lewis Ames,
Attorney.

No. 704,697. Patented July 15, 1902.
W. W. DEAN.
TELEPHONE HOOK SWITCH.
(Application filed May 9, 1901.)
(No Model.) 2 Sheets—Sheet 2.
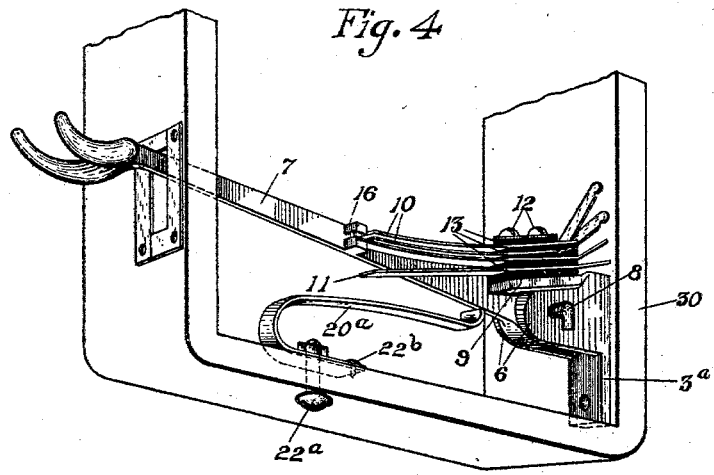
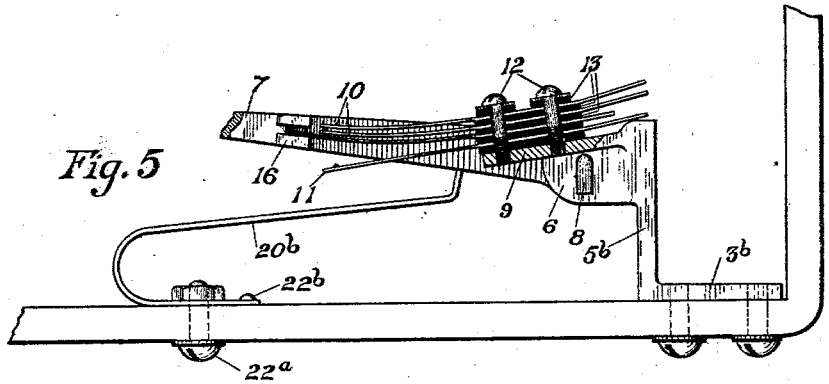
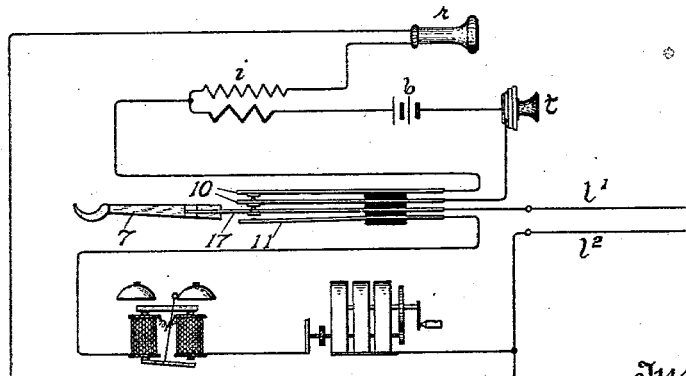
Witnesses.
Inventor.
William W. Dean.
by Robert Lewis Ames,
Attorney.

UNITED STATES PATENT OFFICE.

WILLIAM W. DEAN, OF CHICAGO, ILLINOIS, ASSIGNOR TO KELLOGG SWITCH-BOARD AND SUPPLY COMPANY, OF CHICAGO, ILLINOIS, A CORPORATION OF ILLINOIS.

TELEPHONE HOOK-SWITCH.

SPECIFICATION forming part of Letters Patent No. 704,697, dated July 15, 1902.

Application filed May 9, 1901. Serial No. 59,474. (No model.)

*To all whom it may concern:*

Be it known that I, WILLIAM W. DEAN, a citizen of the United States, residing at Chicago, in the county of Cook, State of Illinois, have invented new and useful Improvements in Telephone Hook-Switches, (Case No. 37,) of which the following is a specification.

My invention relates to improvements in apparatus used at subscribers' stations in telephone systems, and has particular reference to that part of the apparatus known as the "hook-switch." Such apparatus commonly includes a pivoted hook, upon the free end of which the receiver is adapted to be normally hung and which when the receiver is removed for talking serves to operate the switch-springs located adjacent the hook to change the circuits through the apparatus from normal or ringing condition to talking condition, the reverse operation taking place upon the restoration of the receiver to the hook. A spring device is also provided of sufficient strength to lift the hook when it is relieved of the weight of the receiver and to cause it to shift the spring-contacts operated by the hook. A box or cover is usually provided for the protection of these parts and only the free end of the hook is allowed to project outside of the same. It has been the common practice to mount the several parts comprising the switch upon the back board or base of the subscriber's instrument or upon the inside of the box or cover. It has also been common to mount the hook upon one part and the springs upon another and in other inconvenient and disjointed relations. Such methods of mounting them are troublesome, as well as expensive, and require great care in locating and adjusting the parts. Any slight variation from the proper location is liable to cause the assembled device to work inefficiently, while any change occurring after installation, as by the shrinking, swelling, or warping of the woodwork, may cause an entire failure of the apparatus. It has also been usual to include the hook and its lifting-spring in the circuits involved in talking and ringing; but in such arrangements the objectionable electrical contact of the pivot-joint of the hook and that between the hook and the spring occur either in the talking or ringing circuit. My invention seeks to avoid these difficulties by embodying in a single compact structure the working parts of the switch, whereby is obtained an efficient and durable device which is convenient to install and always remains in adjustment.

The invention further consists of the novel details of construction and combinations of parts hereinafter fully described, and particularly pointed out in the appended claims, reference being had to the accompanying drawings, forming a part hereof, in which the same reference characters designate like parts throughout the several views, and in which—

Figure 1 is a perspective view of one form of the invention. Fig. 2 is a plan view thereof. Fig. 3 is a side elevation of the same, showing in section the means of securing the spring-strips. Fig. 4 is a perspective view of another form. Fig. 5 is a side elevation of still another form, and Fig. 6 is a diagram of the circuits that may be involved in the use of the instrument.

As stated above, the support for the hook-switch may be secured to the backboard or base of the instrument or to the inside of the cover in any convenient way. As shown in Fig. 1, the part to which it is attached is designated by the numeral 2 and constitutes the backboard or base of the instrument. The support, which is preferably a casting of brass or composition, comprises in this instance a foot or base 3, which is suitably apertured for the screws 4, passing through the back piece 2 and threading thereinto to hold the same in position. From the pedestal or foot the standard 5 projects outwardly and is provided at its outer end with the hook-supporting means, consisting, preferably, of two pivot lugs or ears 6, between which the telephone-hook 7 is pivoted upon the pin 8, so as to oscillate in a vertical plane, said hook extending through a slot in the cover, which serves to limit its movement in both directions. A forwardly and outwardly projecting ledge 9 is formed integrally with one of the pivot ears or lugs 6, upon the upper face of which and parallel with the hook the flat switch-springs 10 and 11 are secured by screws 12, threading into the ledge, strips of rubber or fiber 13 being placed between the said switch-springs and between the last spring and the ledge 9 to insulate them from each other and from the ledge. One of the springs 17 extends beyond the others and projects into the slot or notch formed in the lug 16 on the hook 7. When, therefore, the hook 7 oscillates, as when the receiver is taken off or replaced, the lug 16 moves the spring 17 back and forth to open and close the contact between the springs 10 and 11 and to change the circuits therethrough in accordance with the arrangements and connections. The circuit wires or conductors are connected permanently with the rear rigid ends of the springs. In this form also the lift-spring 20 of the hook is mounted upon the same support as the hook itself, the rearwardly-extending ledge 21 being formed for the purpose, to the under side of which the rear end 22 of spring 20 is secured by the bolt 23. The spring extends forwardly beneath the other parts of the support and its front end 24 is bent upwardly, as shown, to engage the lower side or edge of the hook-switch 7. This spring is so formed and is of such strength as to cause the hook to rise and shift the springs 10 and 11 when the receiver is taken off and to be overcome and operated in the reverse direction by the weight of the receiver when it is replaced.

In the form of the invention illustrated in Fig. 4 the support is adapted to be secured to the edge or side of the box or cover by screws passing through said cover and threading into its foot or base $3^a$. The pivot-ears 6, as before, are carried by said foot and the hook is pivotally secured thereto. The ledge 9 is formed in substantially the same relation as in the former instance and upon which the switch-springs 10 and 11 are mounted in a similar manner to be operated by the lug 16 upon the side of the telephone-hook. In this case, however, the lifting-spring $20^a$ is mounted beneath the hook on the inside of the cover and not upon the support, as in the former instance, its upper and free end being bent backwardly and upwardly to bear against the lower edge of the hook and its other end being secured by means of bolt $22^a$ and a steady-pin $22^b$ to the lower piece or side of the said cover.

In the form shown in Fig. 5 the support is adapted to be secured to the lower side of the cover by means of the foot $3^b$, held by screws, as before, a standard $5^b$ extending between it and the pivot for the hook. The switch-springs are secured to the ledge 9 and are operated by the hook 7. Here, again, the lifting-spring $20^b$ is secured to the lower side of the cover instead of to the hook-pivot support; otherwise the construction is similar to that before described.

In both Figs. 4 and 5 the number of the switch-springs differ from those seen in Fig. 1 to correspond with a different circuit arrangement, and I consider this a valuable feature of the invention, that the number of these springs may be varied as desired to suit any circuit combination by merely adding or taking away springs either above or below the main operating-spring 17, no other change in the apparatus being required. Another important advantage in this construction resides in the fact that neither the hook nor the lifting-springs are in the circuit, and the electric contacts formed therethrough are in no wise depended upon. The springs may be supplied with platinum or other desired contacts, and the circuit-wires are soldered directly to the rear stationary ends, thus avoiding any movable circuit wires or connectors. This arrangement is therefore an ideal and a practically successful arrangement and construction for the circuit-changing switch.

The diagram of Fig. 6 illustrates a circuit which may be employed in association with the switch of Fig. 4 or 5, the talking position being shown, in which the receiver is off the hook, and circuit from the main-line conductor $l'$ is completed through the springs 17 and 10, the secondary of the induction-coil $i$ and the receiver $r$ to line-wire $l^2$, while a local circuit, containing the battery $b$ and the transmitter $t$, is also closed through the springs 10. Upon the replacement of the receiver on the hook circuit is opened through springs 10 and closed through spring 11 to the bell and generator ready to receive or send a signal. Other circuit arrangements could be and are employed, but are not necessary to be illustrated.

By the term "operatively insulated" in reference to the switch-springs I mean such an arrangement as will constitute an operative switching device, for it is apparent that all springs need not be insulated from the support.

Although I have specified screws as the most convenient means for securing the group of springs together and to the support, it is obvious that other suitable means may be used.

While I have described my invention with particular reference to the details of construction and arrangement, I would have it understood that it is not to be limited thereto, as it is apparent that various changes and modifications may be made therein and still come within its scope and principle; and What I do claim, and desire to secure by Letters Patent, is—

1. In a telephone hook-switch, the combination with a single integral metallic support, of a hook-lever pivoted upon said support, a group of circuit-changing contact-springs and alternately-disposed insulating material directly mounted upon said support, and means for changing said springs from signaling position to talking position, and vice versa by the hook, substantially as described.

2. In a telephone hook-switch, the combination with a metallic supporting-standard, of a hook-lever pivoted upon said standard, a group of circuit-changing contact-springs and alternately - disposed insulating material, means for securing said group of springs together, said means also serving to clamp said group of springs to the support, one of said springs projecting beyond the others, and a lug upon the switch-hook to engage said projecting spring to change the set from signaling to talking position, and vice versa, in the operation of the hook, substantially as described.

3. In a telephone hook-switch, the combination with a metallic support, of a hook-lever pivoted upon said support, a group of circuit-changing contact-springs and alternately-disposed insulating material, screws for securing said springs and strips together and to said support, said springs adapted to be operated by said hook-lever, and a lifting-spring for said hook-lever, the electric circuits being completed through said contact-springs independently of the lever and lifting-spring, substantially as described.

4. In a telephone hook-switch, the combination with a metallic support, provided with pivot-ears and a ledge at one side of said ears, of a hook-lever pivoted in said ears and carrying a slotted lug, switch-springs mounted upon said ledge parallel with said hook and having their free ends adjacent said lug, one of said springs being longer than the others and extending into the slot of said lug, whereby the springs are changed from signaling to talking positions, and vice versa, by the operation of the hook, substantially as described.

5. In a telephone hook-switch, the combination with a metallic support, of a hook-lever pivoted upon said support, a ledge on said support, a plurality of superimposed switch-contact springs, with insulating-strips therebetween mounted upon said ledge, a readily-removable means to clamp and bind said springs and strips in place whereby their number may be readily varied, one of said springs being extended to engage the telephone-hook to change them from signaling to talking position and vice versa in the operation of the hook, substantially as described.

6. In a telephone hook-switch, the combination with a metallic support, of a hook-lever pivoted upon said support, a group of circuit-changing contact-springs and alternately-disposed insulating material directly mounted upon said support, and adapted to be operated by the hook, and a lifting-spring secured to said support and adapted to lift the said hook-lever, substantially as described.

7. In a telephone hook-switch, the combination with a metallic support provided with ledges, of a hook-lever pivoted upon said support, a set of switch-springs mounted upon one of said ledges and adapted to lie alongside the hook-lever and to be operated thereby to change the circuits from talking to signaling positions, and vice versa, and a leaf-spring secured at one end to the other ledge and engaging the hook-lever with its free end to lift the same, substantially as described.

8. In a telephone hook-switch, the combination with a single integral metallic support, of a hook-lever mounted upon said support, a group of circuit-changing contact-springs also mounted upon said support, said lever being arranged to operate said springs from a point between the pivot and free end of the lever, substantially as described.

9. In a telephone hook-switch, the combination with a single integral support, of a hook-lever pivoted upon said support, a group of circuit-changing contact-springs and alternately-disposed insulating material directly mounted upon said support, said lever being arranged to operate said springs from a point between the pivot and free end of the lever, substantially as described.

10. In a telephone hook-switch, the combination with a single integral support, of a hook-lever pivoted upon said support, a group of circuit-changing contact-springs and alternately-disposed insulating material directly mounted upon said support and out of the plane of vibration of the hook-lever, and means for operating said springs by said hook-lever, substantially as described.

11. In a telephone hook-switch, the combination with a single integral metallic support, of a hook-lever pivoted thereto, a group of circuit-changing contact-springs also mounted upon said support and out of the plane of vibration of the hook-lever, and means for changing said springs from one position to another by the hook, substantially as described.

12. In a telephone hook-switch, the combination with a support, of a hook-lever pivoted thereto, a group of circuit-changing contact-springs mounted upon said support out of the plane of vibration of said lever, and means connected with the lever between its pivot and free end for operating said springs, substantially as described.

13. In a telephone hook-switch, the combination with a support, of a hook-lever pivoted thereto, a group of circuit-changing contact-springs mounted upon said support at the side of said lever and extending substantially parallel thereto, and means connected with the lever between its pivot and free end for operating said springs, substantially as described.

14. In a telephone hook-switch, the combination with a metallic support, of a hook-lever pivoted upon said support, a group of circuit-changing contact-springs and alternately-disposed insulating material directly mounted upon said support, and means for positively operating said springs in both directions by the hook, substantially as described.

15. In a telephone hook-switch, the combination with a metallic supporting-standard, of a hook-lever pivoted upon said standard, a group of circuit-changing contact-springs and alternately-disposed insulating material, means for securing said group of springs together, said means also serving to clamp said group of springs to the support, one of said springs projecting beyond the others and adapted to engage the switch-hook whereby the springs are positively moved from talking to signaling position, and vice versa, by the hook, substantially as described.

16. In a telephone hook-switch, the combination with a metallic supporting-standard, of a hook-lever pivoted upon said standard, a group of circuit-changing contact-springs and alternately-disposed insulating material, means for securing said group of springs together, said means also serving to clamp said group of springs to the support, one of said springs projecting beyond the others, said hook being adapted to transversely engage said projecting spring to change the group from one position to another in the operation of the hook, substantially as described.

17. In a telephone hook-switch, the combination with a single integral metallic support, of a hook-lever pivoted upon said support, a group of circuit-changing contact-springs and alternately-disposed insulating material directly mounted upon said support, and means for changing said springs from signaling position to talking position, and vice versa, controlled by the hook, substantially as described.

18. In a telephone hook-switch, the combination with a single integral metallic support, of a hook-lever pivoted upon said support, a group of circuit-changing contact-springs and alternately-disposed insulating material directly mounted upon said support, and means tending to cause said lever to rise, said springs being controlled by the hook, substantially as described.

19. In a telephone hook-switch, the combination with a metallic supporting-standard, of a hook-lever pivoted upon said standard, a group of circuit-changing contact-springs and alternately-disposed insulating material, means for securing said group of springs together, said means also serving to clamp said group of springs to the support, one of said springs projecting beyond the others, a projection upon the hook to engage said projecting spring to control the set in changing from signaling to talking position, and vice versa, and means to exert an upward spring-pressure upon the hook, substantially as described.

20. In a telephone hook-switch, the combination with a support, of a hook-lever pivoted upon said support, a group of circuit-changing contact-springs and alternately-disposed insulating material directly mounted upon said support and extending substantially parallel with the switch-hook lever, said group of springs being out of the plane of vibration of the hook-lever, and means for operating said springs by the hook-lever, substantially as described.

21. In a telephone hook-switch, the combination with a metallic support, of a hook-lever pivoted upon said support, a group of circuit-changing contact-springs and alternately-disposed insulating material directly mounted upon said support, and independent means tending to cause said lever to rise, said springs being controlled by the hook, substantially as described.

In witness whereof I hereunto subscribe my name in the presence of two witnesses.

WILLIAM W. DEAN.

Witnesses:
KEMPSTER B. MILLER,
LEROY D. KELLOGG.